US007850927B2

(12) United States Patent
Takeuchi

(10) Patent No.: US 7,850,927 B2
(45) Date of Patent: Dec. 14, 2010

(54) HOLDING SEAL MEMBER FOR EXHAUST GAS PURIFIER, EXHAUST GAS PURIFICATION APPARATUS EMPLOYING THE SAME, JIG FOR CHAMFERING HOLDING SEAL MEMBER, AND METHOD FOR MANUFACTURING HOLDING SEAL MEMBER

(75) Inventor: Hiroaki Takeuchi, Takahama (JP)

(73) Assignee: Ibiden Co., Ltd., Gifu (JP)

( * ) Notice: Subject to any disclaimer, the term of this patent is extended or adjusted under 35 U.S.C. 154(b) by 1102 days.

(21) Appl. No.: 11/408,796

(22) Filed: Apr. 21, 2006

(65) Prior Publication Data

US 2007/0048196 A1 Mar. 1, 2007

(30) Foreign Application Priority Data

Aug. 10, 2005 (JP) ............................ 2005-232410
Sep. 27, 2005 (JP) ............................ 2005-280020

(51) Int. Cl.
*B01D 50/00* (2006.01)

(52) U.S. Cl. ...................................................... 422/179

(58) Field of Classification Search ................. 422/168, 422/179, 180

See application file for complete search history.

(56) References Cited

U.S. PATENT DOCUMENTS 3,992,157 A 11/1976 Stute ........................... 23/288
4,382,590 A 5/1983 Pandya et al. .............. 269/87.2
5,287,625 A 2/1994 Herron ........................ 30/289
7,587,819 B1 * 9/2009 Hall, Jr. ....................... 29/890
2002/0189097 A1 12/2002 Collins et al. ................. 29/890
2004/0052694 A1 3/2004 Nishikawa et al.
2004/0156760 A1 8/2004 Watanabe .................. 422/179
2007/0053804 A1 3/2007 Agata
2007/0081926 A1 4/2007 Okabe
2007/0160509 A1 7/2007 Saiki
2007/0212272 A1 9/2007 Okabe

FOREIGN PATENT DOCUMENTS

DE 19603951 8/1997
EP 1 036 920 A2 9/2000
EP 1 342 888 A1 9/2003
JP 2001-316965 11/2001
JP 2002-349253 A 4/2002
JP 2003-020938 1/2003
JP 2006-161667 A 6/2006

* cited by examiner

*Primary Examiner*—Tom Duong
(74) *Attorney, Agent, or Firm*—Marsh Fischmann & Breyfogle LLP

(57) ABSTRACT

A chamfered holding seal member has an edge including an inclined surface. When the holding seal member, which is for winding around an exhaust gas purifier body, is inserted into a tubular shell, the holding seal member elastically deforms and the inclined surface becomes substantially flush with the end face of the exhaust gas purifier body.

14 Claims, 9 Drawing Sheets

HOLDING SEAL MEMBER FOR EXHAUST GAS PURIFIER, EXHAUST GAS PURIFICATION APPARATUS EMPLOYING THE SAME, JIG FOR CHAMFERING HOLDING SEAL MEMBER, AND METHOD FOR MANUFACTURING HOLDING SEAL MEMBER

CROSS-REFERENCE TO RELATED APPLICATIONS

This application is based upon and claims the benefit of priority from prior Japanese Patent Applications No. 2005-232410, filed on Aug. 10, 2005, and No. 2005-280020, filed on Sep. 27, 2005, the entire contents of which are incorporated herein by reference.

BACKGROUND OF THE INVENTION

The present invention relates to a holding seal member for covering the peripheral surface of an exhaust gas purifier body housed in a metal shell, an exhaust gas purification apparatus employing the same, a jig for chamfering the holding seal member, and a manufacturing method for the holding seal member.

An exhaust gas treatment apparatus for use in a vehicle is normally located in the middle of an exhaust passage in a vehicle. A diesel particulate filter (DPF) and an exhaust gas purifying catalyst converter, which removes graphite particles referred to as particulates, are known in the prior art as examples of an exhaust gas treatment apparatus. A typical exhaust gas treatment apparatus includes an exhaust gas purifier body, a metal pipe (shell) enclosing the exhaust gas purifier body, and a holding seal member filling the gap between the exhaust gas purifier body and the metal pipe.

The holding seal member must function to prevent the exhaust gas purifier body from being broken when hit against the metal pipe due to vibrations of the vehicle. The holding seal member must also function to prevent the exhaust gas purifier body from falling off from the metal pipe or moving in the metal pipe when subjected to exhaust gas pressure. Further, the holding seal member must prevent the exhaust gas from leaking out of the gap between the metal pipe and the exhaust gas purifier body.

FIG. 1 shows a conventional holding seal member 14*p*. FIG. 2 shows an exhaust gas treatment apparatus employing the conventional holding seal member 14*p*. The holding seal member 14*p* is formed by cutting a fiber mat 16 having uniform thickness and resilience. The holding seal member 14*p* is wound around the peripheral surface of an exhaust gas purifier body 21. The exhaust gas purifier body 21, around which the holding seal member 14*p* is wound, is pressed into a metal tubular shell 23. The exhaust gas treatment apparatus is assembled in this manner (refer to JP-A-2001-316965).

The exhaust gas purifier body is, for example, a catalyst carrier. Catalytic activity is dependent on the temperature. The fiber mat must be thermally insulative to ensure sufficient reactivity for the catalyst from an initial state of usage. The material of the fiber mat is, for example, inorganic fibers such as alumina fibers. JP-A-2003-20938 describes a holding seal member having of which heat resistance, holding capacity under high temperatures, and resistance to eolian erosion are all improved. This holding seal member is made from inorganic fibers having an adjusted rate of mullitization.

When the holding seal member 14*p* and the exhaust gas purifier body 21 are pressed into the shell 23, a shearing force acts on the inner surface 14*n* and outer surface 14*j* of the holding seal member 14*p* so as to deform the holding seal member 14*p*. As shown in FIG. 3, a projection 14*k* projects from the deformed holding seal member 14*p*. The projection 14*k* has an acute apex between the outer surface 14*j* and end surface 14*d* of the holding seal member 14*p*. The angle of the projection 14*k* opposing the acute apex faces the direction opposite from the direction in which the holding seal member 14*p* and the exhaust gas purifier body 21 are pressed.

Even if the holding seal member has improved resistance to eolian erosion, the acute apex of the projection 14*k* is apt to being eroded by exhaust gas and thus easily breaks. Inorganic fibers released from the broken projection 14*k* may enter the exhaust gas purifier body 21 and clog the exhaust gas purifier body 21.

Recent improvement in engine performance causes a trend of increasing exhaust gas pressure. Thus, the holding seal member 14*p* is wrapped around the entire outer peripheral face of the exhaust gas purifier body 21 so as to keep holding the exhaust gas purifier body 21 even under high exhaust gas pressure. This has induced a recent problem in that the projection 14*k* is easily produced, resulting in clogging of the exhaust gas purifier body.

Further, if the projection 14*k* is cut after pressing the holding seal member 14*p* into the shell 23, the exhaust gas purifier body 21 and the shell 23 may be damaged. Therefore, it is not desirable to cut the holding seal member 14*p* after the holding seal member 14*p* is pressed into the shell 23.

SUMMARY OF THE INVENTION

One aspect of the present invention is a holding seal member for winding around an exhaust gas purifier body, having an inlet into which exhaust gas enters and an outlet end from which the exhaust gas exits, and holding the exhaust gas purifier body in a tubular shell. The holding seal member includes a first surface for contacting the exhaust gas purifier body during use of the holding seal member. A second surface for contacting the shell when the holding seal member is wound around the exhaust gas purifier body. A chamfered end placed adjacent the inlet of the exhaust gas purifier body during use of the holding seal member. The chamfered end includes an inclined surface inclined relative to at least the second surface when the holding seal member is not in use.

Another aspect of the present invention is an exhaust gas purification apparatus provided with an exhaust gas purifier body including an inlet for receiving exhaust gas, an outlet end for discharging exhaust gas, and a peripheral surface. A holding seal member includes a first surface, a second surface, and a chamfered end having an inclined surface inclined relative to at least the second surface between the second surface and the first surface. The holding seal member is wound around the exhaust gas purifier body with the first surface of the holding seal member contacting the peripheral surface of the exhaust gas purifier body. The chamfered end of the holding seal member is adjacent to the inlet of the exhaust gas purifier body. A tubular shell houses the exhaust gas purifier body. The holding seal member contacts both the exhaust gas purifier body and the tubular shell.

A further aspect of the present invention is a sheet-shaped holding seal member for use with an exhaust gas purifier body having an inlet into which exhaust gas enters. The holding seal member has a uniform thickness and an inclined surface inclined in association with the inlet of the exhaust gas purifier body during use of the holding seal member.

Another aspect of the present invention is a chamfering jig for use with a planar blade for manufacturing a holding seal member for winding around an exhaust gas purifier body to hold the exhaust gas purifier body in a tubular shell. The holding seal member is sheet-shaped and includes a side surface and a bottom surface. The chamfering jig includes a case having a side wall and a bottom wall for respectively contacting the side surface and the bottom surface of the holding seal member. The case includes a recess defined by the side and bottom walls. A cover covers the recess of the case. The recess and the cover define an accommodation compartment for accommodating the holding seal member. The cover has a cover slit for forming a chamfered portion in one edge of the holding seal member accommodated in the recess. The slit is adapted to receive the planar blade and guide the movement of the planar blade.

A further aspect of the present invention is a chamfering jig for use with a planar blade for manufacturing a holding seal member for winding around an exhaust gas purifier body to hold the exhaust gas purifier body in a tubular shell, wherein the holding seal member is sheet-shaped and includes a side surface and a bottom surface. The chamfering jig includes a case having a side wall and a bottom wall respectively contacting the side surface and the bottom surface of the holding seal member. The case includes a recess defined by the side and bottom walls. The case includes a case slit for forming a chamfered portion on one edge of the holding seal member when accommodated in the recess and guiding movement of the planar blade.

A further aspect of the present invention is a method for manufacturing a holding seal member. The method includes the steps of cutting an inorganic fiber mat to form a sheet-shaped article including a side surface, a bottom surface, first and second surfaces, an end surface, and an edge between the second surface and the end surface. The method further includes positioning a chamfering jig including a case having a side wall and a bottom wall to respectively contact the side surface and the bottom surface of the sheet-shaped article, in which the side and bottom walls define a recess in the case accommodating the sheet-shaped article. The method also includes covering the case with a cover having a slit, inserting a planar blade through the slit, and moving the planar blade along the slit to chamfer the edge between the second surface and the end surface of the sheet-shaped article to form a holding seal member.

In one embodiment, the inclined surface is inclined relative to the second surface at an angle of about 105 to about 150 degrees.

In one embodiment, the inclined surface is inclined relative to the second surface at an angle of about 130 to about 140 degrees.

In one embodiment, the inclined surface is adjacent to the second surface.

In one embodiment, the chamfered end includes the inclined surface and an end surface, which is orthogonal to the first surface and located between the inclined surface and the first surface, the inclined surface extending between the end surface and the second surface.

In one embodiment, the holding seal member is a sheet of inorganic fibers. In one embodiment, the sheet is needle-punched. In one embodiment, the inorganic fibers are alumina-silica fibers. In one embodiment, the inorganic fibers have an average fiber diameter of about 6 μm or greater. In one embodiment, the sheet contains an organic binder.

In one embodiment, the exhaust gas purifier body is a catalyst carrier carrying a catalyst that purifies the exhaust gas or an exhaust gas purifying filter that collects particulates from the exhaust gas.

In one embodiment, the holding seal member elastically deforms between the exhaust gas purifier body and the tubular shell.

In one embodiment, at least one of the side wall and the bottom wall of the recess in the case has a case slit for receiving the planar blade, wherein the case slit and the cover slit lie along the same plane.

In one embodiment, the case slit is formed in the side wall of the recess.

In one embodiment, the cover is separable from the case.

In one embodiment, the holding seal member has a thickness, and the inclined surface connects the second surface to a location on the end surface that is closer to the first surface than a median point of the thickness of the holding seal member.

In one embodiment, the cover slit is inclined relative to an end face of the holding seal member at an angle of about 30 to about 75 degrees.

In one embodiment, the planar blade includes a middle portion and a distal end, and the case slit includes a slit formed in the side walls to guide the middle portion of the planar blade and a slit formed in the bottom wall for receiving the distal end of the planar blade.

In one embodiment, the step of moving the planar blade includes forming an inclined surface connecting the second surface and the end surface of the holding seal member.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A holding seal member for an exhaust gas purifier body according to a preferred embodiment of the present invention will now be described with reference to the drawings.

Figure 2:
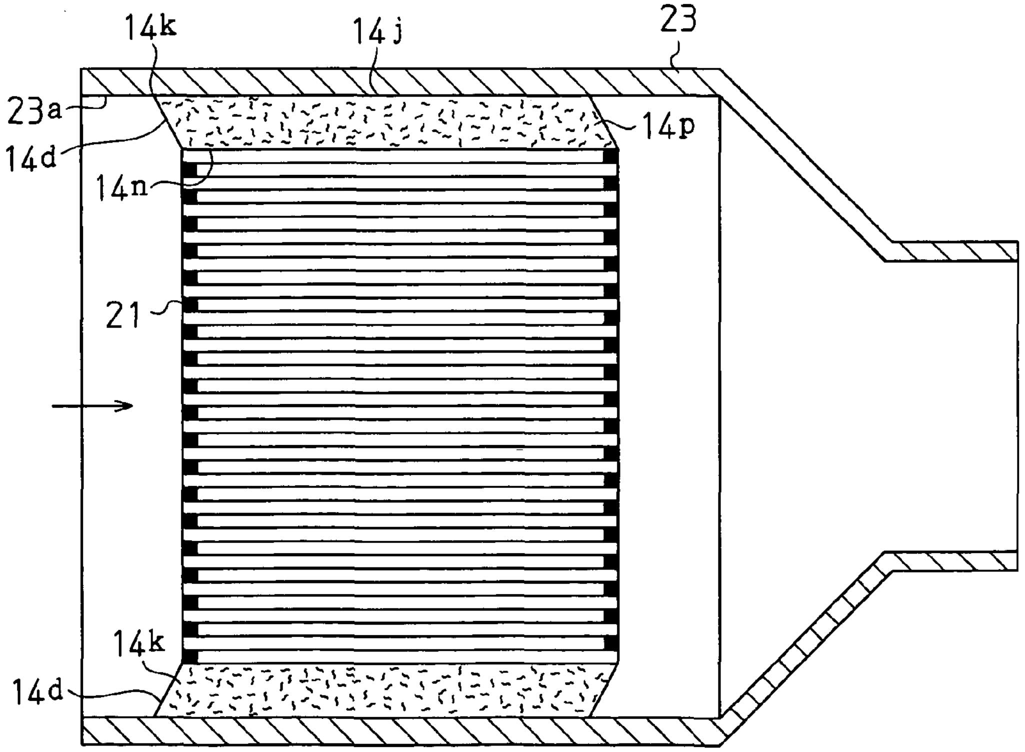
Fig. 2(Prior Art)
FIG. 2 is a cross-sectional view showing an exhaust gas purification apparatus employing the holding seal member of the prior art.
Figure 3:
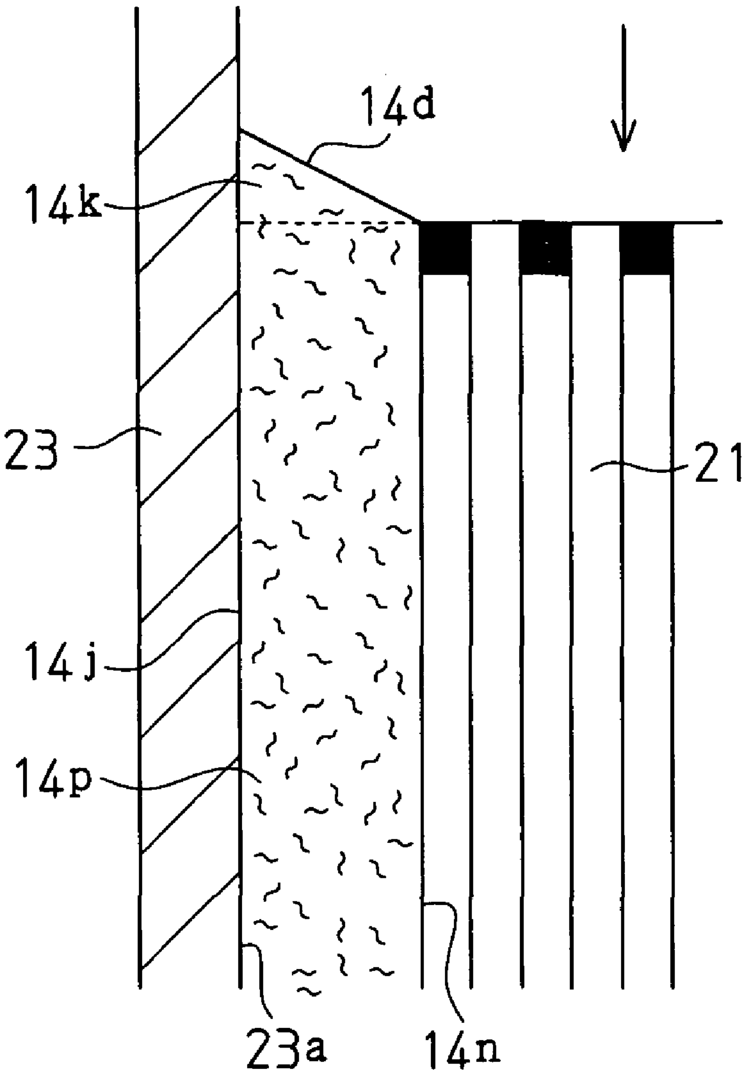
Fig. 3(Prior Art)
FIG. 3 is a partially enlarged cross-sectional view showing the exhaust gas purification apparatus shown in FIG. 2.
Figure 4A:
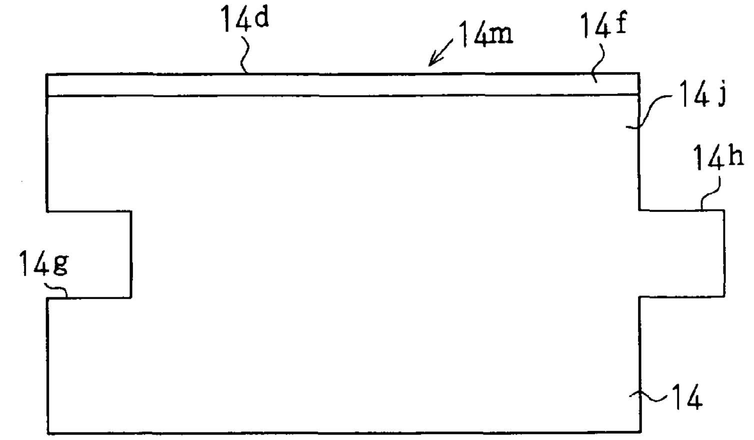
FIGS. 4A, 4B, and 4C are respectively a plan view, a rear view, and a side view showing a holding seal member according to a preferred embodiment of the present invention.
Figure 4B:
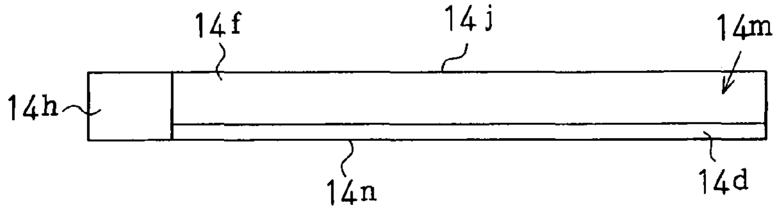
Figure 4C:
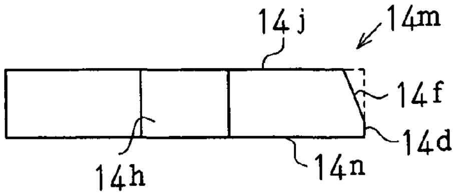
Figure 5A:
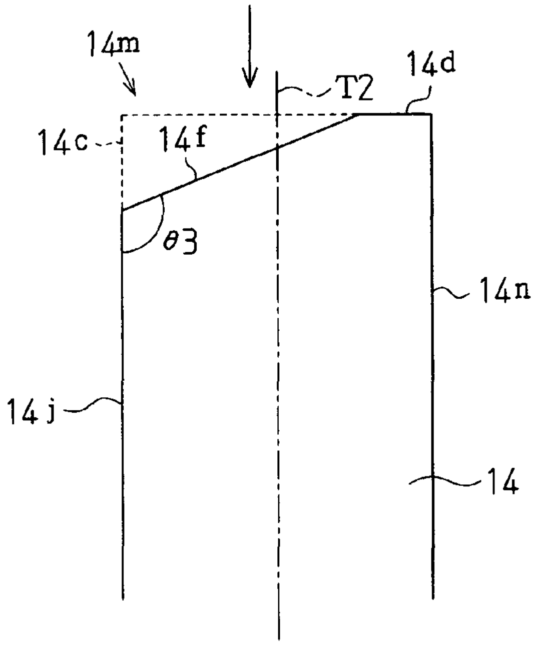
FIG. 5A is a partially enlarged view showing the holding seal member of FIG. 4C.

As shown in FIGS. 4A to 4C, a holding seal member (a retainer sheet member) 14, which is flat and has a uniform thickness, has an inner surface (first surface) 14*n* and an outer surface (second surface) 14*j*. The holding seal member 14 is preferably made from inorganic fibers. One side edge (the upper edge as viewed in FIG. 4A) of the holding seal member 14 is chamfered. As shown in FIG. 5A, the edge 14*c* (indicated by the broken line) between the second surface 14*j* and an end surface 14*d* is removed. In the description hereafter, the end of the holding seal member 14 where the edge 14*c* has been removed is referred to as the chamfered portion 14*m*. The chamfered portion 14*m* includes an inclined surface 14*f*. The edge 14*c* that is to be removed has dimensions and a shape corresponding to at least part of the projection 14*k*, which is formed when a conventional holding seal member is pressed into the shell 23 (see FIG. 2). In other words, the holding seal member 14 is a seal member obtained by removing at least part of the conventional projection 14*k*.

Figure 12:
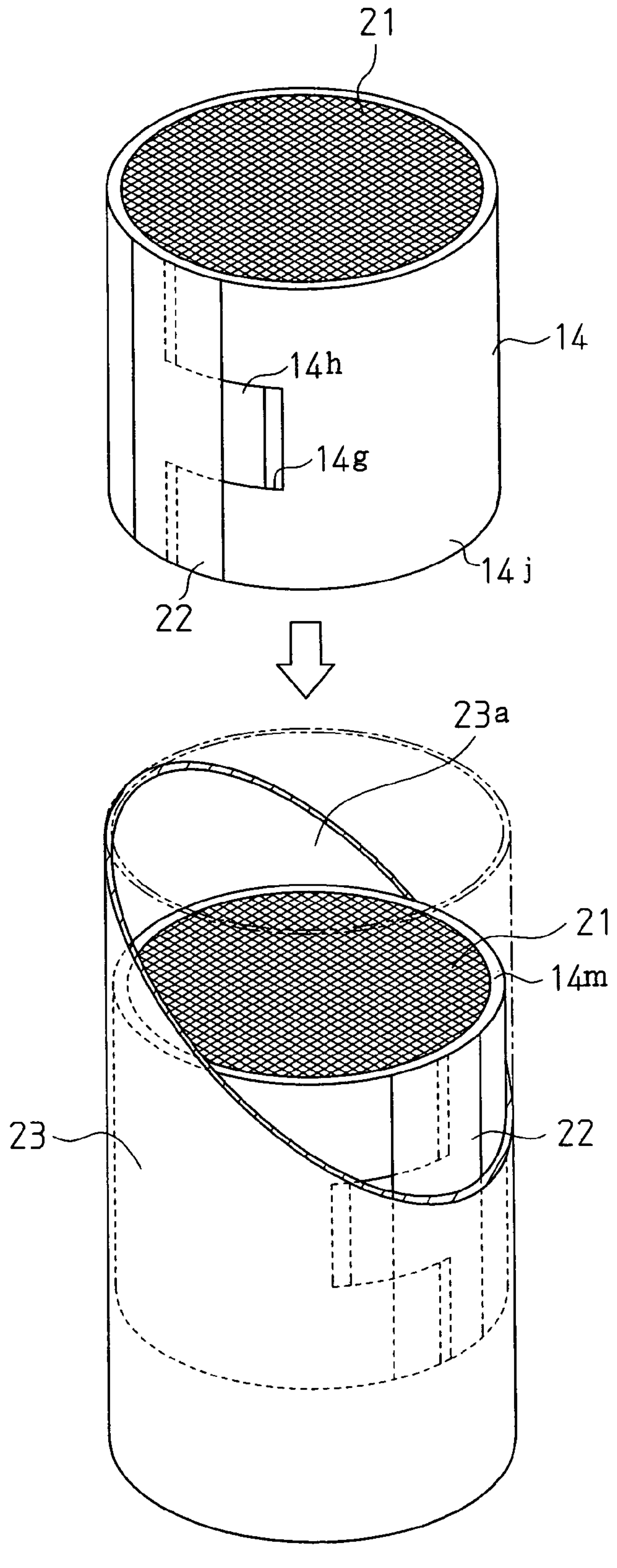
FIG. 12 is a partially cutaway perspective view showing an exhaust gas purification apparatus employing the holding seal member of the preferred embodiment.

As shown in FIG. 12, the holding seal member 14 is wound around an exhaust gas purifier body 21. The holding seal member 14 has a length, or a dimension in the lateral direction of FIG. 4A, corresponding to the circumferential length of the exhaust gas purifier body 21. The holding seal member 14 has a width, or a dimension in the vertical direction in FIG. 4A, corresponding to the longitudinal length of the exhaust gas purifier body 21. The exhaust gas purifier body 21 around which the holding seal member 14 is wound is pressed into the shell 23. The chamfered portion 14*m* faces the direction opposite the direction in which the exhaust gas purifier body 21 is pressed into the shell 23 (indicated by the arrow). In one example, the direction in which the exhaust gas purifier body 21 is pressed into is the same as the direction in which exhaust gas flows into the exhaust gas purifier body 21.

A tab 14*h* and a socket 14*g* for receiving at least part of the tab 14*h* are respectively formed on laterally opposite ends of the holding seal member 14. When the holding seal member 14 is wound around the exhaust gas purifier body 21, at least part of the tab 14*h* is received in and engaged with the socket 14*g*. This prevents formation of a linear gap extending in the axial direction of the shell 23 and thus prevents leakage of exhaust gas. The dimensions of the tab 14*h* and the socket 14*g* increases the tolerance for the circumferential length of the exhaust gas purifier body 21 on which the holding seal member 14 can be wound.

Figure 1:
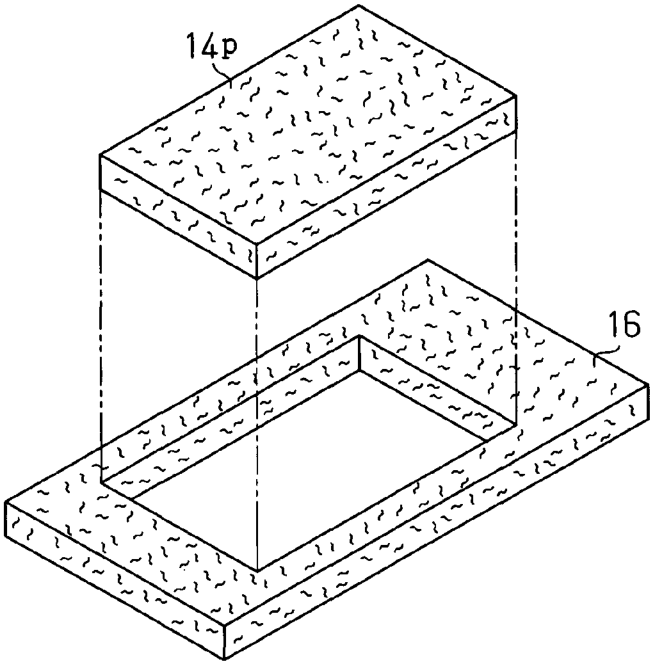
Fig. 1(Prior Art)
FIG. 1 is a perspective view showing a holding seal member of the prior art.

The holding seal member 14 is cut out from an inorganic fiber mat 16 having a uniform thickness (see FIG. 1). The chamfered portion 14*m* is then formed on the holding seal member 14. The inorganic fiber mat 16 has a uniform resilience (elasticity). Preferable examples of the inorganic fiber mat 16 are felt or nonwoven fabrics.

Fiber materials usable for the inorganic fiber mat 16 are, for example, ceramic fibers such as alumina fibers, alumina-silica fibers, silica fibers, and glass fibers. Alumina-silica fibers are preferable due to their high heat resistance, resistance to contact pressure at high-temperatures, and resistance to eolian erosion. The average fiber diameter of the fiber material is determined in accordance with the type of the holding seal member and the resistance to eolian erosion. For example, thick fibers having an average fiber diameter of about 6 μm or greater are preferable for preventing inorganic fibers from being scattered from the holding seal member 14. The inorganic fiber mat 16 may contain an organic binder, such as a water-soluble resin of acrylic resin or polyvinyl alcohol, or a latex, such as acrylic rubber or nitrile rubber, so that the inorganic fiber mat 16 has a predetermined thickness and repulsion prior to being cut.

An example of a method for manufacturing the inorganic fiber mat will now be described. In this example, alumina-silica fibers are used as the inorganic fibers. In the first step, silica sol is added to aqueous solution of basic aluminum chloride to form a precursor of alumina fibers. The aluminum content in the aqueous solution of basic aluminum chloride is 75 g/L, and the atomic ratio of Al/Cl is 1.8. The amount of added silica sol is adjusted so that the relative proportions of alumina and silica in the alumina fibers is from 60:40 to 80:20, and preferably from 70:30 to 74:26. As long as the relative proportion is within the range mentioned above, the proportion of mullite formed from alumina and silica is sufficient for achieving low heat conductivity and sufficient heat insulation.

Then, an organic polymer such as polyvinyl alcohol is added to the precursor of alumina fibers and the resultant is concentrated to prepare a spinning solution. Fibers are formed from the spinning solution by the blowing method. The blowing method is a method in which fibers are formed by using air blown out of an air nozzle and the spinning solution extruded from a spinning solution supply nozzle.

The blowing method is preferably designed such that the flow of air and the flow of spinning solutions are parallel to each other, and the airflow is sufficiently rectified before coming into contact with the spinning solution. In this case, the diameter of the spinning nozzle is typically from about 0.1 to about 0.5 mm, and the amount of the spinning solution extruded from one supply nozzle is typically about 1 to about 120 mL/h, and preferably about 3 to about 50 mL/h. The gas flow rate per slit from the air nozzle is typically about 40 to about 200 m/s. By optimizing the spinning condition in this manner, the spinning solution extruded from the spinning solution supply nozzle is drawn into a sufficiently long fiber without being sprayed (atomized), and the fibers thus formed will not be fused together. Consequently, homogeneous alumina fibers with reduced variation in the fiber diameter can be obtained.

Alumina fibers have an average fiber length of about 250 μm or more, and preferably about 500 μm or more. As long as the average fiber length is about 250 μm or more, the fibers entwine sufficiently to provide the holding seal member 14 with enough strength to be tightly wound around a catalyst carrier.

The alumina fibers spinned from the alumina fiber precursor are deposited in layers to produce a laminated sheet of alumina fibers. The thickness of the laminated sheet is set as required depending on the type of the holding seal member 14 and the type and bulk density of the exhaust gas purifier body 21. The laminated sheet of alumina fibers is preferably subjected to needle punching (needling). The needle punching reduces the thickness of the laminated sheet making it easier to handle and causes the fibers in different layers of the laminated sheet to entwine more tightly. The needle punching is preferably performed by inserting each needle in the direction intersecting with the interfaces between the layers in the laminated sheet.

The needle punching will now be described. A needle board having a plurality of holes arranged at equal spacing is placed on the laminated sheet of alumina fibers. In one example, the needle board has holes arranged at a density of about 500 holes per 100 $cm^2$. Needles are inserted into the laminated sheet of alumina fibers through the holes of the needle board under room temperature. The laminated sheet is then heated and continuously baked at a maximum temperature of 1250° C. to obtain a continuous laminated sheet of alumina fibers having a predetermined weight per unit area.

The continuous laminated sheet of alumina fibers is cut out to make it easier to handle. During this cutting, particular attention should be paid to the content of spherical alumina powder, which is referred to as a "shot", contained in the continuous laminated sheet of alumina fibers. The shot is generated during the blowing process using the spinning solution. If the continuous laminated sheet contains 7% or more shot, the alumina fibers will be easily damaged when packed at a bulk density (GBD) of about 0.2 to about 0.55 g/$cm^3$. A holding seal member containing damaged alumina fibers is apt to induce scattering of fibers when assembling a catalyst converter.

Subsequently, an organic binder is applied on the cut-out continuous laminated sheet. The organic binder facilitates the assembling to an exhaust passage. Further, in the next step, a concavo-convex pattern is transferred to the surface of the organic binder layer. The organic binder, for example, includes an acrylic (ACM), acrylonitrile-butadiene rubber (NBR), or stylene-butadiene rubber (SBR) resin. The application of the organic binder will now be described. In the first step, an aqueous dispersion containing the organic binder and water is produced. The aqueous dispersion is poured over the continuous laminated sheet conveyed on a conveyor. Any excessive resin (solid content) and moisture absorbed in the laminated sheet are removed through suction.

Moisture is removed through heat compression and drying. The compression is carried out by using two pressure plates each having a surface with a predetermined concavo-convex pattern. The laminated sheet of alumina fibers is compressed between the two pressure plates. This removes excessive moisture and simultaneously transfers the concavo-convex patterns to the two sides of the laminated sheet of alumina fibers. The compression process reduces the bulkiness of the laminated sheet of alumina fibers and facilitates handling. Furthermore, when exposed to exhaust gas during use, the organic binder is dissipated and the compressed laminated sheet of alumina fibers restores the original bulkiness. Thus, the holding seal member 14 holds and retains the exhaust gas purifier body 21 more tightly in the shell 23.

Subsequently, the laminated sheet of alumina fibers is dried at about 95 to about 155° C. As long as the drying temperature is in the range of about 95° C. to about 155° C., the laminated sheet can be completely dried in a short period of time without decomposing the organic binder, and the production efficiency is not deteriorated. The drying is preferably performed for about 100 seconds or more so that the laminated sheet of alumina fibers is sufficiently dried. The laminated sheet of alumina fibers may be compressed during the drying. Preferably, the laminated sheet of alumina fibers is compressed in a space of about 4 to about 15 mm. The volume-reducing effect described above is obtained without damaging the alumina fibers as long as the space is in the range of about 4 to about 15 mm. The manufacture of the inorganic fiber mat 16 is completed in this manner.

Figure 9A:
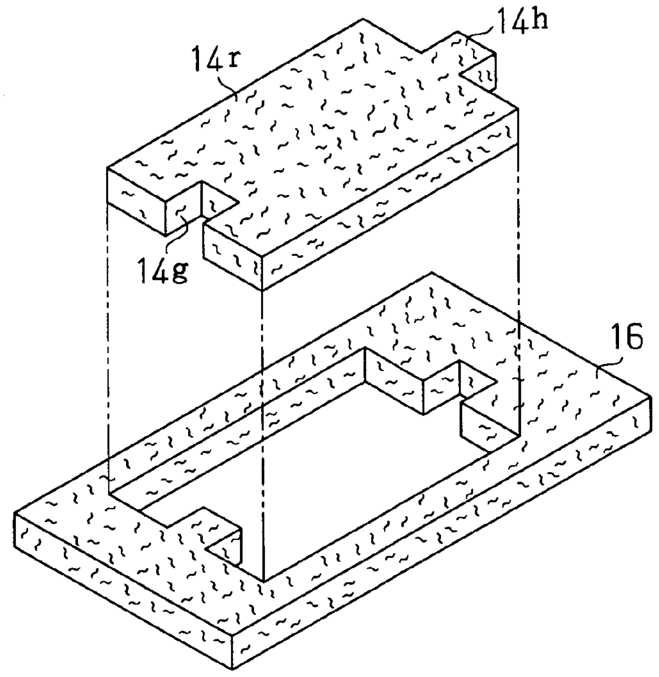
FIG. 9A is a perspective view showing a holding seal member after being cut out of an inorganic fiber mat but prior to being chamfered.
Figure 9B:
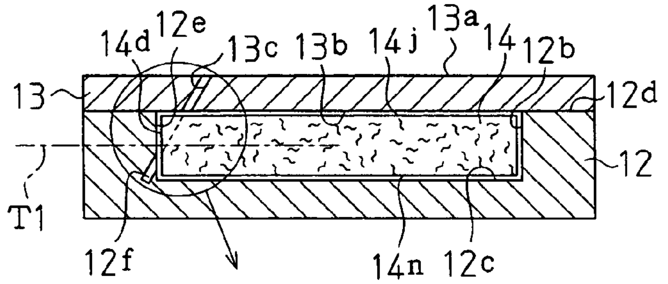
FIG. 9B is a cross-section view taken along line 9B-9B in FIG. 8.

The inorganic fiber mat 16 is then cut with the use of a punching die or the like to obtain a holding seal member 14*r* shown in FIG. 9A. In this state, the inorganic fiber mat 16 has not yet been chamfered.

Figure 5B:
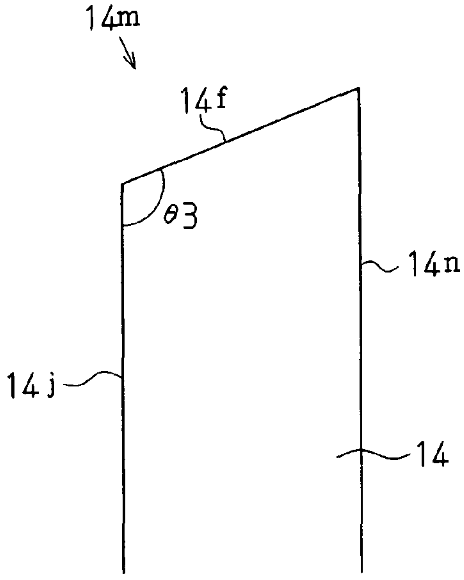
FIG. 5B is a modification of the holding seal member shown in FIG. 5A.

The chamfered portion 14*m* will now be discussed. As shown in FIG. 5A, the inclined surface 14*f* faces an exhaust gas inlet. The inclined surface 14*f* is at least part of the surface between the first surface 14*n* of the holding seal member 14, which is in contact with the exhaust gas purifier body 21, and the second surface 14*j*, which is in contact with the inner circumferential surface 23*a* of the shell. Preferably, the inclined surface 14*f* connects the second surface 14*j* and a position of the end surface 14*d* that is closer to first surface 14*n* than a median point T2 of the thickness of the holding seal member 14. Most preferably, as shown in FIG. 5B, the inclined surface 14*f* connects the second surface 14*j* and the first surface 14*n*.

In the description hereafter, an angle θ3 formed between the inclined surface 14*f* and the second surface 14*j* is also referred to as the chamfer angle or the angle of the inclined surface 14*f*. The angle θ3 is preferably from about 105 to about 150 degrees, more preferably from about 130 to about 140 degrees, and most preferably about 135 degrees. When the angle θ3 is from about 105 to about 150 degrees, the projection 14*k* (FIG. 2) having an acute apex is reduced in size or is not formed at all. This ensures the capability of the holding seal member 14 to hold the exhaust gas purifier body 21. Also, the clogging of exhaust gas purifier body 21 is effectively prevented. Further, since the capability of the holding seal member 14 for holding the exhaust gas purifier body 21 does not decrease, the holding seal member 14 is prevented from being displaced with respect to the exhaust gas purifier body 21 so as to project from the end face of the exhaust gas purifier body 21 when pressed into the shell. An angle θ4 formed between the inclined surface 14*f* and the end surface 14*d* is preferably from about 30 to about 75 degrees, more preferably about 40 to about 50 degrees, and most preferably about 45 degrees. For example, when the angle θ4 is about 30 degrees, the angle θ1 is set to about 60 degrees and the angle θ2 is set to about 150 degrees.

The manufacturing of the holding seal member 14, in particular, the formation of the chamfered portion 14*m* will now be discussed. The chamfered portion 14*m* is formed by using a chamfering jig 11 shown in FIGS. 7 to 11. The chamfering jig 11 includes a case 12 having a recess 12*a*, and a cover 13 attached to the upper face of the case 12 to cover the recess 12*a*. When the cover 13 is attached to the case 12, the cover 13 and the recess 12*a* define an accommodation compartment for accommodating the holding seal member 14*r* which has not yet been chamfered.

The case 12 and the cover 13 are made of a metal such as steel, stainless steel, or brass. The recess 12*a* has a shape corresponding to the shape of the holding seal member 14*r* prior to chamfering. The side walls 12*b* and the bottom 12*c* of the recess 12*a* are brought into contact with the side faces and the first surface 14*n* of the unchamfered holding seal member 14*r*, respectively. It is preferable that the upper surface 12*d* of the case 12 be higher than the second surface 14*j* of the unchamfered holding seal member 14*r* when the unchamfered holding seal member 14*r* is received in the recess 12*a*.

Figure 9C:
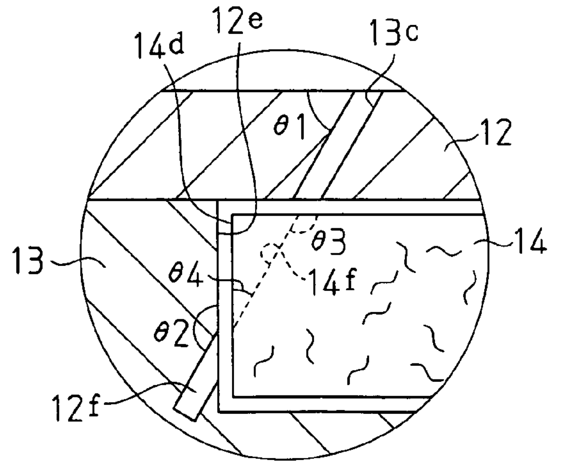
FIG. 9C is a partially enlarged view of FIG. 9B.

As shown in FIG. 9C, the side walls 12*b* of the case 12 includes a side wall 12*e* facing the end surface 14*d* of the unchamfered holding seal member 14*r*. A narrow groove or a second slit 12*f* is formed in the side wall 12*e*. The second slit 12*f* is inclined relative to the side wall 12*e* at an angle θ2. The second slit 12*f* preferably opens in the side wall 12*e* at a location lower than the median point T1 of the depth of the recess 12_a_. More preferably, the second slit 12_f_ opens at the boundary between the side wall 12_e_ and the bottom 12_c_. In this case, the inclined surface 14_f_ is formed without decreasing the width of the holding seal member 14.

It is preferred that the external shape of the cover 13 be the same as that of the case 12 from the viewpoint of alignment. The thickness of the cover 13 is set in accordance with the material of the cover 13 and the size of the holding seal member 14.

An elongated opening, or first slit 13_c_, extends through the cover 13 from the upper surface 13_a_ to the lower surface 13_b_. The first slit 13_c_ is inclined relative to the upper surface 13_a_ or lower surface 13_b_ of the cover 13 at angle θ1. The first slit 13_c_ and the second slit 12_f_ lie along the same plane when the cover 13 is mounted on the case 12.

Figure 10:
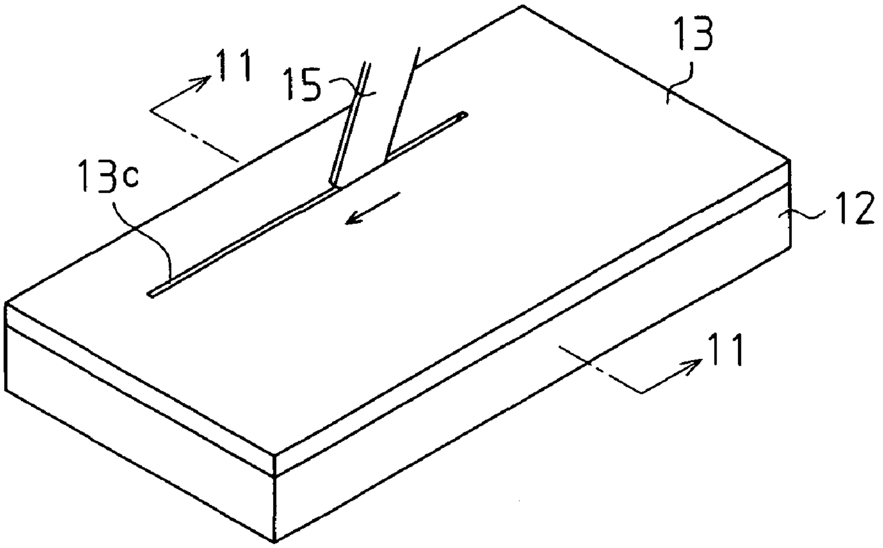
FIG. 10 is a perspective view showing the chamfering jig of FIG. 7 during use.
Figure 11:
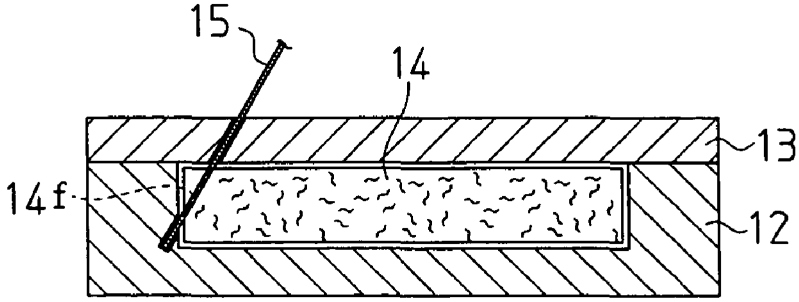
FIG. 11 is a cross-section view taken along line 11-11 in FIG. 10.

As shown in FIGS. 10 and 11, the inclined surface 14_f_ is formed in the end surface 14_d_ by inserting a planar blade 15 through the first slit 13_c_ and the second slit 12_f_ and then moving the blade 15 in this state.

The angle θ1 of the first slit 13_c_, the position in which the first slit 13_c_ opens in the upper surface 13_a_, the angle θ2 of the second slit 12_f_, and the position in which the second slit 12_f_ opens in the side wall 12_e_ are set as required in accordance with the inclined surface 14_f_ that is to be formed. For example, when the angle θ3 of the inclined surface 14_f_ is about 135 degrees, the angle θ1 is set to about 45 degrees and the angle θ2 is set to about 135 degrees.

For the formation of the chamfered portion 14_m_ in the holding sealing member 14, the unchamfered holding seal member 14_r_ cut out from the inorganic fiber mat 16 is placed in the recess 12_a_ of the case 12. The end surface 14_d_ of the unchamfered holding seal member 14_r_ is abut against the side wall 12_e_ including the second slit 12_f_. The cover 13 is fixed to the case 12 such that the first slit 13_c_ and the second slit 12_f_ lie along the same plane. The planar blade 15 is inserted through the first slit 13_c_ until the distal end of the planar blade 15 reaches the bottom (the innermost part) of the second slit 12_f_. Then, the planar blade 15 is moved. This forms a chamfered portion 14_m_ including the flat inclined surface 14_f_.

As shown FIG. 12, the holding seal member 14 is wound around the exhaust gas purifier body 21 such that the inclined surface 14_f_ is located at the outer side closer to the shell 23. The tab 14_h_ is fitted in the socket 14_g_. A fastener such as sealing tape 22 may be used to keep the socket 14_g_ and the tab 14_h_ engaged with each other. The exhaust gas purifier body 21 around which the holding seal member 14 is wound is pressed into the tubular shell 23 with the inclined surface 14_f_ facing the direction opposite to the pressing direction. A flange, which is connected to exhaust passage, is attached to each of the open ends of the tubular shell 23. This completes the manufacturing of the exhaust gas purification apparatus. The exhaust gas purification apparatus is attached to the middle of the exhaust passage for use in a vehicle.

The holding seal member of the preferred embodiment has the advantages described below.

Figure 6A:
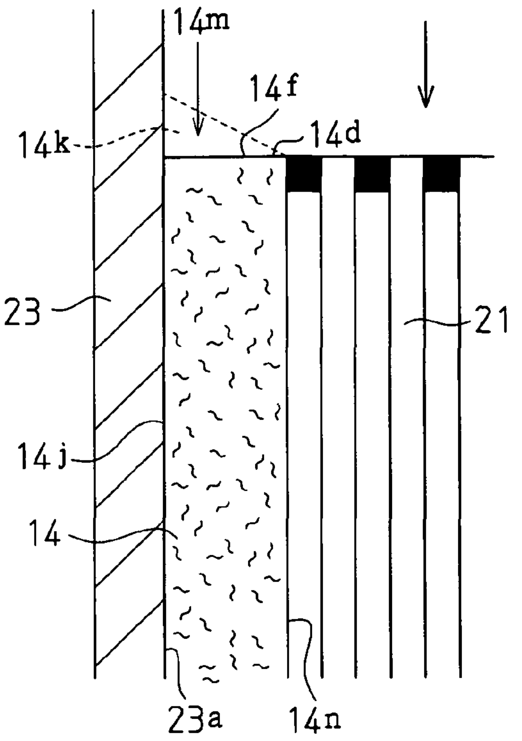
FIGS. 6A and 6B are partially enlarged cross-section views showing an exhaust gas purification apparatus employing a holding seal member of the preferred embodiment.
Figure 6B:
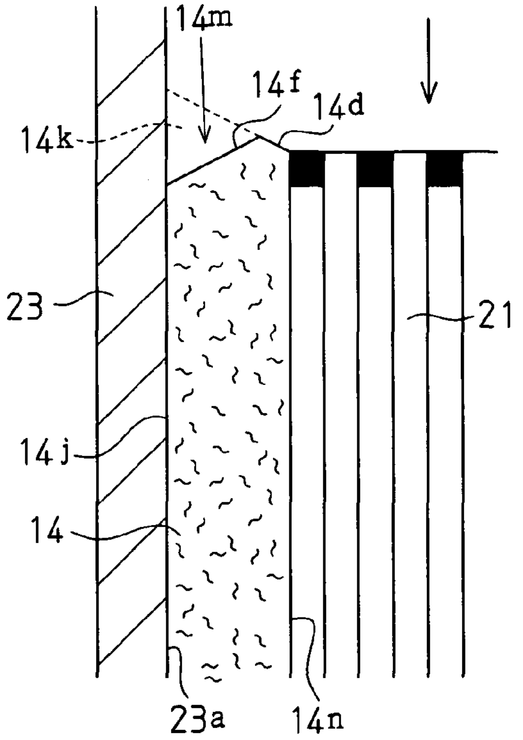
Figure 7:
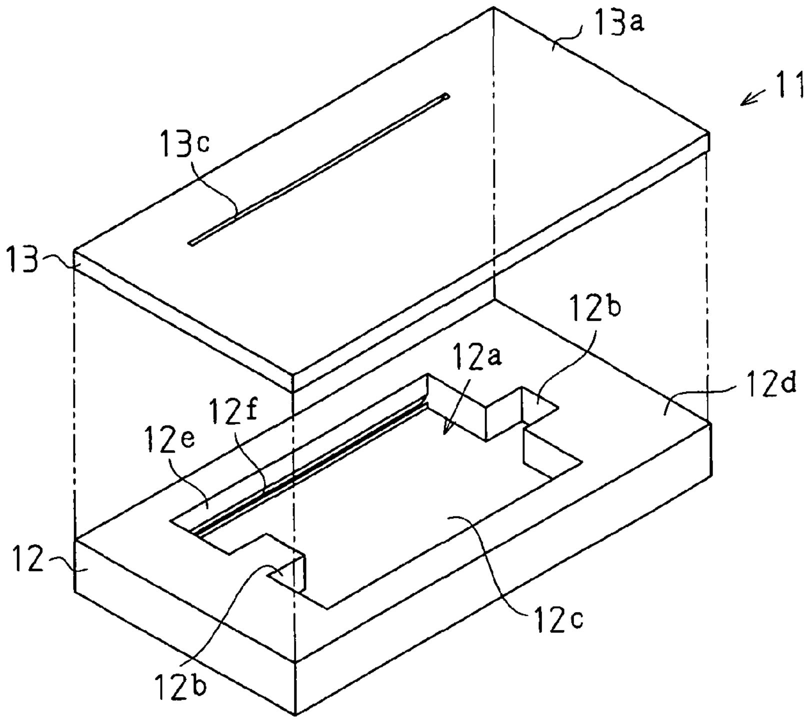
FIG. 7 is a perspective view showing a chamfering jig used for manufacturing the holding seal member of the preferred embodiment.
Figure 8:
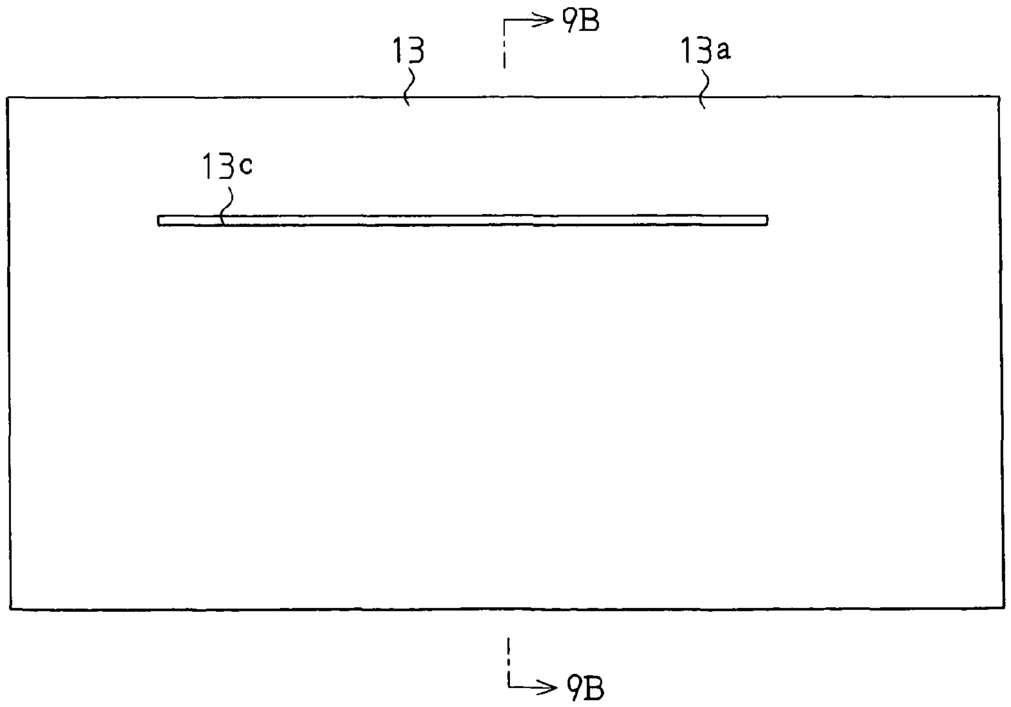
FIG. 8 is a plan view showing the chamfering jig of FIG. 7.

(1) The holding seal member 14 has the chamfered portion 14_m_ including the inclined surface 14_f_. In the example shown in FIG. 6A, the holding seal member 14 is deformed when pressed into the shell. Thus, a right angle or a substantially right angle is formed between the inclined surface 14_f_ and the outer surface 12_j_. In the conventional holding seal member 14_p_, the projection 14_k_ is produced due to friction with the shell inner circumferential surface 23_a_. However, the holding seal member 14 of the preferred embodiment does not have such a projection. In the example shown in FIG. 6B, the projection 14_k_, which would be produced in the conventional holding seal member 14_p_, is reduced in size. This prevents the exhaust gas purifier body 21 from being clogged with inorganic fibers released from the broken projection 14_k_.

(2) No projection 14_k_ is produced in the holding seal member 14, or, if produced, it is reduced in size. Therefore, there is no interference by the projection 14_k_ when attaching the shell 23 to the exhaust passage connecting flange.

(3) The inclined surface 14_f_ is formed by removing the edge 14_c_ between the second surface 14_j_ and the end surface 14_d_ such that the inclined surface 14_f_ does not extend over the edge between the end surface 14_d_ and the first surface 14_n_. Accordingly, the projection 14_k_ can be eliminated or reduced in size without reducing the width of the holding seal member 14.

(4) The angle θ3 of the inclined surface 14_f_ is about 105 to about 150 degrees. Accordingly, the chamfered portion 14_m_ is formed so as to effectively prevent or minimize the formation of the projection 14_k_ without affecting the functions of the holding seal member 14 such as the capability to hold the exhaust gas purifier body 21.

(5) The chamfered portion 14_m_ is formed with the chamfering jig 11 before pressing the holding seal member 14 into the shell 23. Accordingly, no damages are inflicted on the exhaust gas purifier body 21 or the shell 23.

(6) The first slit 13_c_ for guiding the movement of the planar blade 15 and the second slit 12_f_ for guiding the movement of the distal end of the planar blade 15 lie along the same plane and are inclined relative to the upper surface 13_a_ of the cover 13 at a predetermined angle. Thus, the inclined surface 14_f_ is flat.

(7) The inorganic fiber mat 16 may contain an organic binder. An organic binder not only gives predetermined thickness and repulsion to the inorganic fiber mat 16 but also enhances the effect of preventing the scattering of fibers and the easiness of handling the inorganic fiber mat 16.

(8) The inorganic fibers, having an average fiber diameter of about 6 μm or more, are prevented from being scattered into the air. In general, thick fibers tend to increase the possibility of defects existing in the fiber mat, reduce the mechanical strength of the fiber mat, and decrease the resistance to erosion caused by exhaust gas. When thick fibers having an average fiber diameter of about 6 μm or more are used to produce a mat, such a mat is more bulky as compared to a mat having the same weight per area but formed of fibers having a smaller diameter. This would result in a large projection 14_k_ being produced more easily. Such a factor has hindered the use of thick fibers in the conventional holding seal member 14_p_ in which the projection 14_k_ is inevitably produced. In contrast, with the holding seal member 14 of the preferred embodiment having the chamfered portion 14_m_ that prevents or minimizes the formation of the projection 14_k_, a fiber mat of thick fibers having a large average fiber diameter may be used.

(9) The holding seal member 14 is chamfered by moving the cutter blade along the first slit 13_c_ of the chamfering jig 11. This prevents or minimizes the formation of the projection 14_k_.

(10) The second slit 12_f_ extends into the side wall 12_e_ of the recess 12_a_ in the case 12. The distal end of the planar blade 15 is inserted into and moved in the second slit 12_f_ to form the chamfered portion 14_m_.

(11) The chamfering jig 11 has a cover 13 that is separable from the case 12. This facilitates the arrangement of the holding seal member 14 in the recess 12_a_. Also, the cover 13, which covers the case 12, prevents the holding seal member 14 from being moved out of or being displaced in the recess 12_a_ when chamfering the holding seal member 14.

(12) The shape of the recess 12*a* is substantially the same as that of the holding seal member 14. This prevents the holding seal member 14 from being arranged in the case 12 in a mistaken manner.

The preferred embodiment may be modified as described below.

The inclined surface 14*f* does not have to be flat and may be curved or stepped.

The inclined surface 14*f* may be formed to connect the second surface 14*j* and the first surface 14*n* of the holding seal member 14 and inclined toward the exhaust gas inlet.

The inclined surface 14*f* of the holding seal member 14 may be formed with scissors or a knife instead of the chamfering jig 11.

One or more holding seal members 14 may be cut out from a single inorganic fiber mat 16.

The holding seal member 14 may be wound around other types of exhaust gas purifier bodies including an exhaust gas purifying filter such as a diesel particulate filter (DPF) for trapping particulates in the exhaust gas and a catalyst carrier carrying a catalyst for purifying exhaust gas.

Before pressing the holding seal member 14 into the shell 23, a flange may be attached to the shell 23 at an open end opposite the open end into which the holding seal member 14 is pressed.

In the example shown in FIG. 5A, the inclined surface 14*f* connects the second surface 14*j* and the end surface 14*d* of the holding seal member 14. However, the inclined surface 14*f* may connect the first surface 14*n* and the end surface 14*d* of the holding seal member 14. In this case, the holding seal member 14 is assembled into the shell 23 such that the first surface 14*n* of the holding seal member 14 is in contact with the inner circumferential surface 23*a* of the shell 23.

The shape of the recess 12*a* does not necessarily have to be substantially the same as the shape of the holding seal member 14 as long as the side wall 12*e* of the recess 12*a* is in contact with the end surface 14*d* of holding seal member 14.

Examples of modifications of the chamfering jig 11 will be described with reference to FIGS. 13, 14 and 15.

Figure 13:
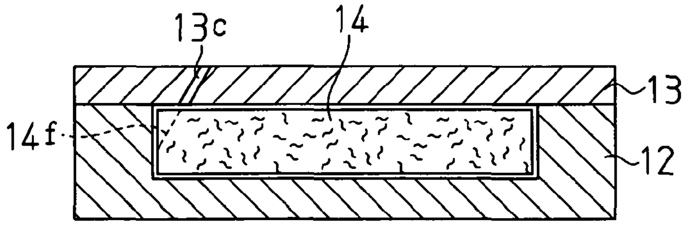
FIGS. 13 to 15 are cross-section views showing other embodiments of the chamfering jig.

In the example shown in FIG. 13, the case 12 has no second slit 12*f*. In this case, the planar blade 15 is inserted and moved in the first slit 13*c* to form the chamfered portion 14*m* including the inclined surface 14*f*.

Figure 14:
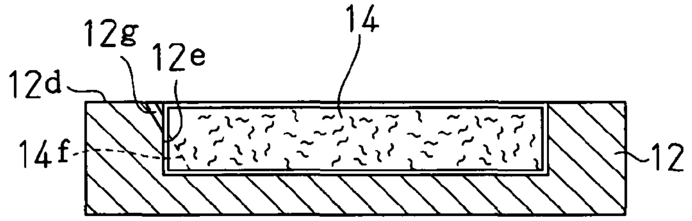

In the example shown in FIG. 14, the chamfering jig 11 has an inclined slit 12*g* connecting the upper surface 12*d* and the side wall 12*e* of the case 12. The inclination angle and formation position of the slit 12*g* are determined in accordance with the inclined surface 14*f* that is to be formed. The planar blade 15 is inserted and moved in the slit 12*g* so that the chamfered portion 14*m* including the inclined surface 14*f* is formed in the edge of the holding seal member 14 at the side closer to the bottom 12*c* of the recess 12*a*. In the modification shown in FIG. 14, the holding seal member 14 is chamfered without using the cover 13.

Figure 15:
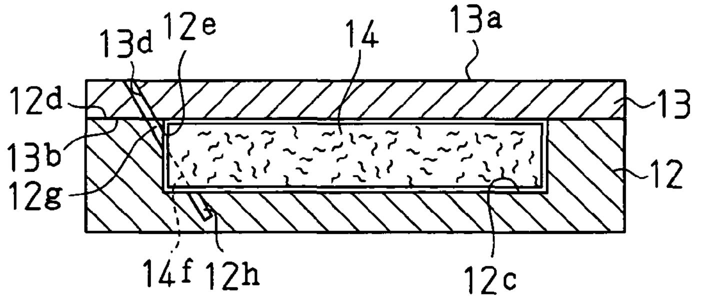

In the example shown in FIG. 15, the chamfering jig 11 has a slit 12*g*, which extends from the upper surface 12*d* of the case 12, and a slit 12*h*, which is formed in the bottom 12*c* of the case 12. The slit 12*h* and the slit 12*g* lie along the same plane. In this example, the chamfered portion 14*m* including the inclined surface 14*f* is formed without any portions remaining uncut. A cover 13 having a slit 13*d* may also be used. In this case, the slit 13*d*, the slit 12*h*, and the slit 12*g* lie along the same plane. In this modification, the cover 13 prevents the holding seal member 14 from being displaced or projected from the case 12. Thus, the chamfered portion 14*m* including the inclined surface 14*f* is formed without any portions remaining uncut.

The cover 13 may be formed integrally with the case 12. The cover 13 may be connected to the case 12 by a hinge so that it may be opened and closed. When the cover 13 is formed integrally with the case 12, it is preferred that the case 12 be provided with an opening for inserting the holding seal member 14 into the recess 12*a*.

Test examples of the holding seal member will now be described.

With regard to test examples 1 to 7 of Table 1, holding seal members were produced by the method described below and attached to a metal shell. Then, the heights of projections produced in the holding seal members were measured and eolian erosion tests were conducted. The results are shown in Table 1.

Method for Manufacturing Alumina Fiber Mat

In the first step, silica sol was added to aqueous solution of basic aluminum chloride to prepare a precursor of alumina fibers. The aluminum content in the aqueous solution of basic aluminum chloride was 75 g/L, and the Al/Cl atom ratio was 1.8. The proportion between alumina and silica in the alumina fibers was $Al_2O_3$:$SiO_2$=72±2:28±2.

An organic polymer of polyvinyl alcohol was added to the precursor of alumina fibers, and the resultant was concentrated to prepare a spinning solution. Fibers were formed from the spinning solution by a blowing method. The fibers were cut to have an average fiber length of 12 mm. The mass of alumina fibers was folded to lay one layer over another to produce a laminated sheet of alumina fibers. The laminated sheet was subjected to needle punching at a density of 500 punches per 100 $cm^2$ and continuously baked at a maximum temperature of 1250° C. The continuous laminated sheet of alumina fibers thus obtained had a weight per unit area of 1160 g/$cm^2$, an average fiber diameter of 7.2 μm, and a minimum fiber diameter of 3.2 μm.

Cutting of Continuous Laminated Sheet of Alumina Fibers

The continuous laminated sheet of alumina fibers was cut to trim the outline to obtain a continuous laminated sheet having a longitudinal dimension of 12750 mm, a lateral dimension of 1280 mm, and a thickness of 9 mm. The shot content in the continuous laminated sheet was measured with the use of a sieve and a weighing meter. The content ratio of shot of 45 μm or greater in the continuous laminated sheet was 7 wt % or less.

Resin Impregnation

An aqueous dispersion of acrylic resin having a solid concentration of 50±10%, and a pH value of 5.5 to 7.5 was prepared (product name LX803, produced by Zeon Corporation, Japan). This aqueous dispersion had a resin concentration of 4.5 wt %. The aqueous dispersion of acrylic resin was poured onto the continuous laminated sheet of alumina fibers that is being conveyed on the conveyor so as to impregnate the continuous laminated sheet of alumina fibers with resin.

Suction of Solids

Suction was performed on the continuous laminated sheet of alumina fibers impregnated with resin to remove excessively absorbed solids from the laminated sheet. The resin impregnation ratio in the continuous laminated sheet was 10.0 wt % after suction for three seconds.

Drying

After adjusting the resin content, the continuous laminated sheet of alumina fibers was thermally compressed and dried. The drying was performed at a temperature of 95 to 155° C. for a period of time of 100 seconds or more. The compression distance during the drying was 4 to 15 mm. After drying, the continuous laminated sheet was punched to obtain a rectangular holding seal member 14*r*.

Chamfering and Measurement of Height of Projection

One edge 14*c* of the holding seal member 14*r* obtained by the punching was removed with the use of the chamfering jig 11 to obtain a chamfered holding seal member 14. This holding seal member 14 had, as shown in FIG. 5B, an inclined surface 14*f* connecting the edge between the end surface 14*d* and the first surface 14*n* to the second surface 14*j*. As shown in Table 1, the angle θ3 formed between the second surface 14*j* and the inclined surface 14*f* varies among the test examples.

In each test example, the holding seal member 14 was wound around the exhaust gas purifier body 21 and pressed into the shell 23. The height (mm) of the projection of the holding seal member 14 projecting rearwards (towards the side where exhaust gas is introduced) from the end face of the exhaust gas purifier body 21 was measured. The measurement results are shown in Table 1.

Eolian Erosion Test

Each holding seal member 14 was cut to a size of 25×50 mm to prepare a sample. The sample was clamped to a bulk density of 0.3 g/cm$^3$ and heated to 700° C. Then, the cut area was exposed to a current of air having a flow rate of 300 m/min, a pressure of 0.2 MPa, and a pulse frequency (on/off=0.5/1.0) of 7000 times to measure the distance of erosion in the cut area caused by the air current. This erosion distance measurement was repeated on five samples for each test example, and the measurements were averaged to give an evaluation result of the eolian erosion test. The evaluation results are shown in Table 1. The results showing an erosion distance of 2.0 mm or less are evaluated as “excellent”, those showing an erosion distance of 2.1 to 6.0 mm are evaluated as “satisfactory”, and those of 6.1 mm or greater are evaluated as “poor”.

TABLE 1

| Test Example | Angle θ3 (degree) | Height of Projection (mm) | Evaluation of Eolian Erosion |
|---|---|---|---|
| 1 | 135 | 0.00 | Excellent |
| 2 | 140 | 1.50 | Excellent |
| 3 | 130 | 1.30 | Excellent |
| 4 | 150 | 5.90 | Satisfactory |
| 5 | 105 | 5.90 | Satisfactory |
| 6 | 155 | 9.20 | Poor |
| 7 | 100 | 6.60 | Poor |

As can be seen from Table 1, the height of the projection became smaller as the angle θ3 approached 135 degrees. When the angle θ3 was out of the range of 105 to 150 degrees, the height of the projection substantially increased, and the erosion distance also increased. When the angle θ3 was less than 135 degrees, only very small projections were observed. When the angle θ3 was greater than 135 degrees, the holding capability of the holding seal member was somewhat deteriorated causing displacement with respect to the purifier 21 and forming a small projection.

Test Examples 8 to 10 shown in Table 2 will now be described. The angle θ3 of the holding seal members 14 in Test Examples 8 to 10 was 130 degrees. An average diameter of the fibers was measured by the method described below. The holding seal members 14 in Test Examples 8 to 10 had the same conditions except for the average fiber diameter. The projection heights were also measured in the same manner in tests of Table 1.

Measurement of Average Fiber Diameter

Alumina fibers were placed in a cylinder and compression-milled at a pressure of 20.6 MPa to produce a sample. The sample was sorted with a sieve. Gold was vapor-deposited on the surfaces of the part of the sample passing through the sieve. The sample was then photographed with an electron microscope at a magnification of about 1500. Diameters of at least 40 fibers appearing in the photo were measured. Five samples were prepared for each test example and photographed. The average fiber diameter is an average of five measurements. The results are shown in Table 2.

TABLE 2

| Test Example | Average Fiber Diameter (micrometers) | Height of Projection (mm) |
|---|---|---|
| 8 | 4.9 | 1.15 |
| 9 | 5.8 | 1.20 |
| 10 | 7.2 | 1.40 |

As seen from Table 2, the height of projection varied slightly when the average fiber diameter was less than 6 μm. When the average fiber diameter was 6 μm or more, the height of projection was increased. This shows that the holding seal member becomes more bulky when the average fiber diameter is large.

The contents of JP-A-2001-316965 and JP-A-2003-20938 are incorporated herein by reference.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A holding seal member for winding around an exhaust gas purifier body that has an inlet end face into which exhaust gas enters and an outlet end from which the exhaust gas exits, and holding the exhaust gas purifier body in a tubular shell, the holding seal member comprising:

a first surface for contacting the exhaust gas purifier body during use of the holding seal member;

a second surface for contacting the shell when the holding seal member is wound around the exhaust gas purifier body; and an inlet-side chamfered end placed adjacent the inlet end face of the exhaust gas purifier body during use of the holding seal member, wherein the inlet-side chamfered end includes an inclined surface inclined relative to at least the second surface when the holding seal member is in a not deformed state before pressing the holding seal member and the exhaust gas purifier body into the tubular shell, wherein at the inlet-side chamfered end in the not deformed state the first surface has a terminal end and the second surface has a terminal end adjacent the inclined surface and that terminates short of the terminal end of the first surface;

wherein the inlet-side chamfered end does not project from the inlet end face of the exhaust gas purifier body toward an exhaust gas inlet of the tubular shell when the holding seal member is in a deformed state as received in the tubular shell with the holding seal member deformed by shearing forces acting on the first and second surfaces in contact with the exhaust gas purifier body and tubular shell respectively when the holding seal member and the exhaust gas purifier body are pressed into the tubular shell.

2. The holding seal member according to claim 1, wherein the inclined surface is inclined relative to the second surface at an angle of about 105 to about 150 degrees.

3. The holding seal member according to claim 2, wherein the inclined surface is inclined relative to the second surface at an angle of about 130 to about 140 degrees.

4. The holding seal member according to claim 1, wherein the inclined surface is adjacent to the second surface.

5. The holding seal member according to claim 1, wherein the chamfered end includes the inclined surface and an end surface, which is orthogonal to the first surface and located between the inclined surface and the first surface, the inclined surface extending between the end surface and the second surface.

6. The holding seal member according to claim 1, wherein the holding seal member is a sheet of inorganic fibers.

7. The holding seal member according to claim 6, wherein the sheet is needle-punched.

8. The holding seal member according to claim 6, wherein the inorganic fibers are alumina-silica fibers.

9. The holding seal member according to claim 6, wherein the inorganic fibers have an average fiber diameter of about 6 μm or greater.

10. The holding seal member according to claim 6, wherein the sheet contains an organic binder.

11. The holding seal member according to claim 1, wherein the exhaust gas purifier body is a catalyst carrier carrying a catalyst that purifies the exhaust gas or an exhaust gas purifying filter that collects particulates from the exhaust gas.

12. The holding seal member according to claim 1, wherein the holding seal member is elastically deformable and the inlet-side chamfered end surface becomes substantially flush with the inlet end face of the exhaust gas purifier body.

13. An exhaust gas purification apparatus comprising:

an exhaust gas purifier body including an inlet end face into which exhaust gas enters, an outlet end from which the exhaust gas exits, and a peripheral surface;

a holding seal member including a first surface, a second surface, and an inlet-side chamfered end, the holding seal member being wound around the exhaust gas purifier body with the first surface of the holding seal member contacting the peripheral surface of the exhaust gas purifier body, and the inlet-side chamfered end of the holding seal member being adjacent to the inlet end face of the exhaust gas purifier body with a terminal end of the first surface adjacent to the inlet end face; and a tubular shell housing the exhaust gas purifier body, with the holding seal member contacting both the exhaust gas purifier body and the tubular shell, wherein the inlet-side chamfered end includes an inclined surface inclined relative to at least the second surface when the holding seal member is in a not deformed state before pressing the holding seal member and the exhaust gas purifier body into the tubular shell, wherein in the not deformed state, the second surface of the holding seal member has a terminal end adjacent the inclined surface that terminates short of the terminal end of the first surface of the holding seal member;

as disposed in the gas purification apparatus the holding seal member is in a deformed state as deformed by shearing forces acting on the first and second surfaces in contact with the gas purifier body and tubular shell respectively when the holding seal member and the exhaust gas purifier body are pressed into the tubular shell, wherein in the deformed state the inlet-side chamfered end does not project from the inlet end face of the exhaust gas purifier body toward an exhaust gas inlet of the tubular shell.

14. The exhaust gas purification apparatus according to claim 13, wherein the holding seal member elastically deforms between the exhaust gas purifier body and the tubular shell.

* * * * *